Jan. 21, 1964  E. M. AMIR  3,118,947
EPOXIDE CONVERSION PROCESS
Filed June 22, 1960
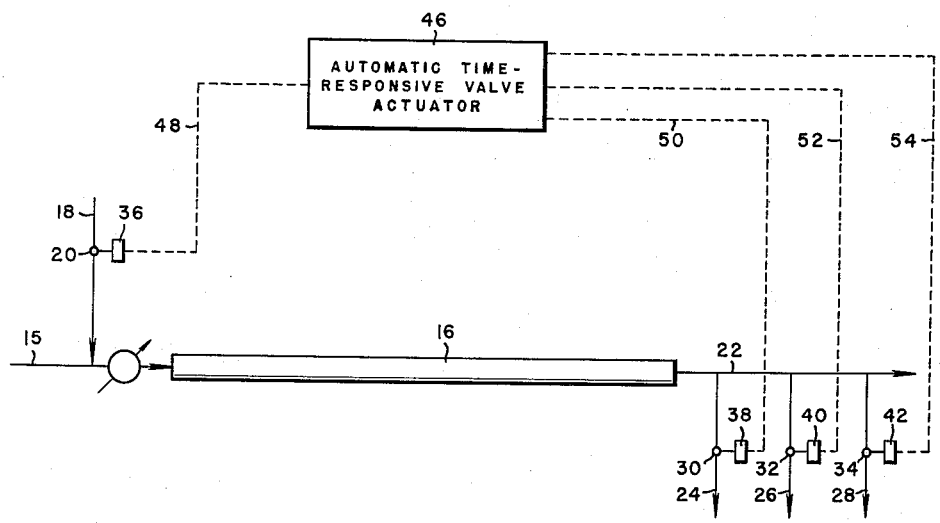
INVENTOR.
EMANUEL M. AMIR,
BY
ATTORNEY.

United States Patent Office 3,118,947
Patented Jan. 21, 1964

3,118,947
EPOXIDE CONVERSION PROCESS
Emanuel M. Amir, Baytown, Tex., assignor, by mesne assignments, to Esso Research and Engineering Company, Elizabeth, N.J., a corporation of Delaware
Filed June 22, 1960, Ser. No. 38,069
6 Claims. (Cl. 260—593)

This invention relates to a process for the conversion of epoxides and for the simultaneous separation of the resultant conversion products. More particularly, this invention relates to the conversion of tri-substituted ethylene oxides and to the simultaneous separation and recovery of the thus-prepared conversion products.

Trialkyl-substituted ethylene oxides may be characterized as comparatively stable compounds, especially in comparison with tetra-substituted ethylene oxides. Accordingly, the rearrangement of trialkyl-substituted ethylene oxides to useful products and with high selectivities presents a serious problem.

This application is a continuation-in-part of copending Amir application Serial No. 755,780, filed August 18, 1958, and entitled "Conversion of Epoxides."

In copending Amir application Serial No. 755,780, entitled "Conversion of Epoxides," filed August 18, 1958, now U.S. Patent No. 3,068,291, it is disclosed that trialkyl-substituted ethylene oxides may be catalytically rearranged with high conversion by bringing the trialkyl-substituted ethylene oxide into contact with finely divided calcined diatomaceous earth at a temperature within the range of about 70° to 600° F.

It has now been discovered that when the conversion process described in said copending Amir application is conducted in the presence of a catalyst prepared by impregnating finely divided calcined diatomaceous earth with a high boiling stable organic material which does not volatilize under the conditions to be utilized, the high boiling organic material will function as a substrate to permit a chromatographic type of separation of the conversion products in the conversion zone. As a consequence, each of the conversion products is recovered in substantially purified form at the outlet of the conversion zone in accordance with the present invention.

The starting material of the present invention may be characterized as a compound having the formula:

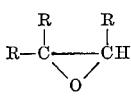

wherein R is an alkyl group.

Preferably, R represents an alkyl group having 1 to 6 carbon atoms, the total number of carbon atoms in the molecule being not more than about 10.

Exemplary of the volatilizable tri-substituted ethylene oxides which may be utilized in accordance with the present invention are compounds such as 2-methyl-2,3-epoxypentane, 3-methyl-2,3-epoxypentane, 2-methyl-2,3-epoxybutane; the 2- and 3-methyl substituted epoxy-2,3-hexanes, heptanes and octanes; 2,3-epoxy pentanes, hexanes, etc. substituted with ethyl, propyl or butyl groups in the 2 or 3 position, etc.

The feed stocks of the present invention may consist essentially of the tri-substituted ethylene oxides or may comprise mixtures of tri-substituted ethylene oxides with other hydrocarbon compound types.

The conversion process of the present invention, as indicated, is preferably conducted at a temperature within the range of about 70° to about 600° F. However, a preferred temperature to be utilized within this range is a temperature within the range of about 150° to about 300° F. Pressure and contact time are not critical and may therefore be varied within wide limits.

The catalyst to be utilized is a calcined diatomaceous earth (e.g., diatomaceous earth fired at a temperature in excess of 600° F. sufficient to convert the diatomaceous earth to "firebrick").

The finely divided calcined diatomaceous earth, acting as a support, is impregnated with a high boiling stable organic material. The impregnation step may be accomplished, for example, by preparing a solution of the organic material in a light volatile solvent such as ether, low boiling hydrocarbon, etc., by slurrying the finely divided diatomaceous earth in the solution, and by thereafter evaporating off the solvent.

The amount of high boiling organic material to be utilized may be varied within comparatively wide limits. However, it is generally preferable to employ about 30 to 60 weight percent of high boiling organic material, based on the weight of the calcined diatomaceous earth catalyst.

Representative of the non-volatile high boiling stable organic materials which may be utilized as the non-reactive, liquid substrate in accordance with the present invention are alkyl esters of benzene polycarboxylic acids such as $C_4$ to $C_{20}$ alkyl esters of benzene, di-, tri-, tetra-, penta- and hexacarboxylic acids such as the butyl, octyl, dodecyl, etc. esters of phthalic acid, isophthalic acid, pyromellitic acid, etc. Other high boiling hydrocarbons may be used such as petroleum hydrocarbons, lubricating oil fractions, greases, etc., silicone oils, etc., polyethylene glycols and polypropylene glycols, etc.

The conversion products formed by the treatment of tri-substituted ethylene oxides in the presence of calcined diatomaceous earth within the above-indicated temperature range include diolefins, terminal aldehydes, and ketones. The diolefins are useful as monomeric starting materials for the preparation of high molecular weight polymers. The ketones are useful as high boiling solvents and the aldehydes are useful as raw materials for the preparation of acids or highly stable alcoholic solvents.

The invention will be further illustrated with reference to the accompanying drawing wherein the single figure is a schematic elevational drawing illustrating the conversion of tri-substituted ethylene oxides in accordance with the present invention and the simultaneous recovery of the conversion products.

In the drawing there is shown an elongated conversion zone 16 which is filled with a finely divided calcined diatomaceous earth catalyst previously treated with a nonreactive, nonvolatile, high boiling substrate type material such as tetraoctyl-pyromellitate. The length-to-diameter ratio of the reactor should be at least 15 to 1 and may suitably be in the range of about 15 to about 1500 to 1. In accordance with the present invention, there is provided a carrier charge line 15 and feed charge line 18 controlled by a valve 20. There is also provided a discharge line 22 containing discharge branch lines 24 to 28 controlled by valves 30 to 34, respectively. The valves 20, 30, 32, and 34 are preferably automatically actuatable valves such as pneumatically or electrically actuatable valves. In this situation, the actuator 36 for the valve 20, the actuator 38 for the valve 30, the actuator 40 for the valve 32, and the actuator 42 for the valve 34 may be electrically interconnected with a timer-controller 46 by way of electrical leads 48 to 54, respectively.

In accordance with the present invention, an inert carrier gas such as helium, methane, ethane, carbon dioxide, carbon monoxide, nitrogen, etc. is continually charged at constant rate by way of the line 15 to the conversion zone 16. The tri-substituted ethylene oxide is charged to the conversion-separation zone 16 in pulses, the pulsing being achieved by periodic actuation of the valve 20 in response to a signal transmitted from the timer-controller 46 to the actuator 36 by way of the lead 48. Each pulse of feed stock, on being brought into contact with the substrate-impregnated silica catalyst, is converted into a mixture of dienes, aldehydes, and ketones. The various components of the reaction product will pass through the elongated conversion-separation zone at specifically different rates of travel whereby they will emerge from the zone 16 into the discharge line 22 in the form of discrete pulses. Thus, for the particular substrate identified, the diolefins will emerge first, followed in sequence by the aldehydes and ketones. In this situation, therefore, the valves 30 to 34 may be actuated by the timer-controller 46 to the said valves in times sequence whereby the conversion products may be recovered in a purified condition directly on discharge from the zone 16. The particular timing sequence will, of course, be determined by the efficiency of the substrate as a separating means for the conversion products and by the chemical identity of the tri-substituted ethylene feed stock. However, the particular time cycles to be employed may be readily determined in a given situation by simple laboratory experimentation, as will be hereinafter set forth in greater detail.

The invention will be further illustrated by the following specific examples which are given by way of illustration and not as limitations on the scope of this invention.

EXAMPLE I

A catalyst was prepared by crushing a calcined diatomaceous earth (Celite-type fire-brick).

After washing with water and drying, a solution of about 10 volume percent of tetraoctylpyromellitate in ether was prepared and the washed and dried finely divided catalyst was slurried in the solution. The ether was removed by volatilization to provide a catalyst composition consisting of the fire-brick impregnated with about 40 weight percent tetraoctyl pyromellitate. Tetraoctyl pyromellitate is a representative member of the class consisting of $C_4$ to $C_{20}$ alkyl esters of benzene polycarboxylic acids.

An elongated column having a length-to-diameter ratio of about 200 to 1 was thereafter packed with the finely divided catalyst material and provided with suitable inlet and outlet lines as shown schematically in the drawing.

The reactor was heated to a temperature of 210° F. and helium continuously passed through the reactor at a rate sufficient to provide a contact time in excess of about 1 minute. Next, a charge consisting of 2-methyl-2,3-epoxypentane was passed through the reaction-separation zone at the indicated reaction temperature of 210° F. The effluent from the reaction zone was monitored with a thermal conductivity cell so that the product stream could be diverted at proper instances into cold traps to condense the various reaction products as they appeared in the effluent. The fractions obtained, the residence time of the fractions within the reaction zone and the composition of the various fractions are set forth in Table I.

Table I

| Fraction | Lapsed Time | | Composition |
|---|---|---|---|
| | Appear, Minutes | Disappear, Minutes | |
| 1 | 8.5 | 15 | Low boiling hydrocarbon and the diene. |
| 2 | 17 | 22 | Pure aldehyde. |
| 3 | 23 | 32.5 | Pure ketone. |

The diene identified in Table I was found to be 2-methyl-1,2-pentadiene and constituted about 8.5 weight percent of the charge. The low boiling hydrocarbons constituted about 0.3 weight percent of the charge. The pure aldehyde was 2,2-dimethyl-1-butanal. The pure ketone was 2-methyl-3-pentanone. The reaction effluent was free from unconverted 2-methyl-2,3-epoxypentane.

It will be apparent that in this instance by charging a pulse of epoxide feed stock every 25 minutes, a continuous process could be provided wherein the various diene, aldehyde and ketone conversion products could be separately recovered from the reaction zone by chromatographic techniques.

Having described my invention, what is claimed is:

1. A method for converting a trialkyl-substituted ethylene oxide feed stock and for simultaneously chromatographically separating the conversion products from each other which comprises the steps of periodically introducing a trialkyl-substituted ethylene oxide feed stock into an elongated conversion zone having a length-to-diameter ratio of at least about 15 to 1 at a temperature within the range of about 70° to 600° F., said conversion zone having an inert gas passed therethrough and containing therein a finely divided calcined diatomaceous earth which acts as the conversion catalyst and a support having thereon a non-reactive, liquid substrate, to thereby convert said feed stock and to separate said conversion products from each other on passage through said elongated conversion zone, and separately recovering separated fractions of said conversion products which comprise the corresponding diolefins, terminal aldehydes and ketones from the discharge end of said conversion zone.

2. A method as in claim 1 wherein the feed stock comprises a $C_5$ to $C_8$ trialkyl substituted ethylene oxide.

3. A method for converting a $C_5$ to $C_8$ trialkyl substituted ethylene oxide feed stock to a mixture of conversion products and simultaneously chromatographically separating said conversion products comprising the corresponding $C_5$ to $C_8$ dienes, aldehydes and ketones which comprises the steps of periodically introducing said feed stock into an elongated conversion zone having an inert gas passed therethrough and having a length-to-diameter ratio within the range of about 15 to 1 to about 1500 to 1 at a temperature within the range of about 70° to about 600° F., said conversion zone containing finely divided calcined diatomaceous earth which acts as the conversion catalyst and a support having thereon from about 30 to 60 weight percent of a $C_4$ to $C_{20}$ alkyl ester of a benzene polycarboxylic acid to thereby convert said feed stock to said mixture of conversion products and simultaneously to separate conversion products in said mixture from each other on passage through said elongated conversion zone and separately recovering separated fractions of said conversion products from the discharge end of said conversion zone.

4. A method as in claim 3 wherein the ester is tetraoctyl pyromellitate and the temperature is in the range of 150° to 300° F.

5. A method as in claim 4 wherein the feed stock is 2-methyl-2,3-epoxypentane.

6. A method as in claim 4 wherein the feed stock is 3-methyl-2,3-epoxypentane.

References Cited in the file of this patent

UNITED STATES PATENTS

| 1,070,120 | Earle et al. | Aug. 12, 1913 |
| 2,106,347 | Groll et al. | Jan. 25, 1938 |
| 2,827,498 | Bottoms | Mar. 18, 1958 |

FOREIGN PATENTS

| 566,156 | Germany | Dec. 15, 1932 |

OTHER REFERENCES

Lederer et al.: Chromatography (2nd Ed.) pages 107–9, 167–8 and 181 (1957).

Weissberger: Techniques of Organic Chemistry, vol. X, Fundamentals of Chromatography, pp. 77–83 (1957), QD251 W44.